United States Patent
Harrington et al.

(10) Patent No.: US 7,983,180 B2
(45) Date of Patent: Jul. 19, 2011

(54) TRIGGERED ANNOUNCEMENT FROM A GATEWAY

(75) Inventors: Kendra S. Harrington, Irvine, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 11/129,549

(22) Filed: May 13, 2005

(65) Prior Publication Data

US 2006/0256800 A1 Nov. 16, 2006

(51) Int. Cl.
*H04L 12/26* (2006.01)
*H04L 12/56* (2006.01)
*H04J 3/24* (2006.01)
*G06F 7/04* (2006.01)

(52) U.S. Cl. .......... 370/252; 370/401; 370/475; 726/16; 726/17; 726/21

(58) Field of Classification Search .................... 370/401
See application file for complete search history.

(56) References Cited

U.S. PATENT DOCUMENTS

| | | | | |
|---|---|---|---|---|
| 6,073,172 | A * | 6/2000 | Frailong et al. | 709/222 |
| 6,433,797 | B1 * | 8/2002 | Zellweger | 715/762 |
| 6,496,858 | B1 * | 12/2002 | Frailong et al. | 709/221 |
| 6,874,088 | B1 * | 3/2005 | Stevens | 726/6 |
| 7,283,505 | B1 * | 10/2007 | Meenan et al. | 370/338 |
| 7,313,606 | B2 * | 12/2007 | Donahue et al. | 709/220 |
| 2003/0236865 | A1 * | 12/2003 | Anthe et al. | 709/220 |
| 2004/0128551 | A1 * | 7/2004 | Walker et al. | 713/201 |
| 2005/0169288 | A1 * | 8/2005 | Kamiwada et al. | 370/401 |

* cited by examiner

*Primary Examiner* — Daniel J Ryman
*Assistant Examiner* — Cassandra Decker
(74) *Attorney, Agent, or Firm* — Haynes and Boone, LLP

(57) ABSTRACT

An advantageous system, apparatus, and method for remotely managing or maintaining a Gateway, such as a residential router, are provided. In one example, the Gateway generates and sends an announcement to a service or equipment provider informing the provider of the Gateway's current IP address (or resolvable name) and a valid password to access the Gateway. Thus, in one example, a service/equipment provider without inherent knowledge of a Gateway IP address may remotely manage or troubleshoot a Gateway using a basic Web browser.

12 Claims, 4 Drawing Sheets

US 7,983,180 B2

TRIGGERED ANNOUNCEMENT FROM A GATEWAY

TECHNICAL FIELD

The present invention relates generally to network management or maintenance and, more particularly, to a system, apparatus, and method for remote management or maintenance of a gateway.

BACKGROUND

A large number of service providers (e.g., Earthlink, Yahoo, T-Mobile, Vonage, etc.) and/or equipment providers with technical support organizations (e.g., Linksys, etc.) ("providers") need accessibility and visibility to the current status of a residential gateway or router ("Gateway") for the purposes of management and/or maintenance, which may include diagnostics and troubleshooting.

However, these service providers and technical support organizations are not the broadband access providers (e.g., Comcast, SBC, etc.) and therefore do not inherently have awareness of the currently assigned IP address of the Gateway. Furthermore, the IP address is typically dynamic (e.g., administered by DHCP or PPP) and will change over time leading to even more difficulty for the provider.

In addition, security typically necessitates a separate password be used for remote access than is used for local access to the Gateway. As a result, a provider will also require such a password in addition to the IP address of the Gateway.

Thus, a means and method to enable the provider to learn either the IP address or a resolvable name (pre-assigned) of the Gateway and/or a password to access the Gateway is highly desirable.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an advantageous system, apparatus, and method for a provider to manage or maintain a Gateway, such as a residential router. Advantageously, the present invention allows the Gateway to create and send a message to a service or equipment provider (optionally having a technical support organization) informing the provider of the Gateway's IP address (or resolvable name) and a valid password to access the Gateway. Thus, the present invention provides the service/equipment provider with a simple management system and method using a basic Web browser to access an existing Web server that typically exists in a Gateway.

Figure 1:
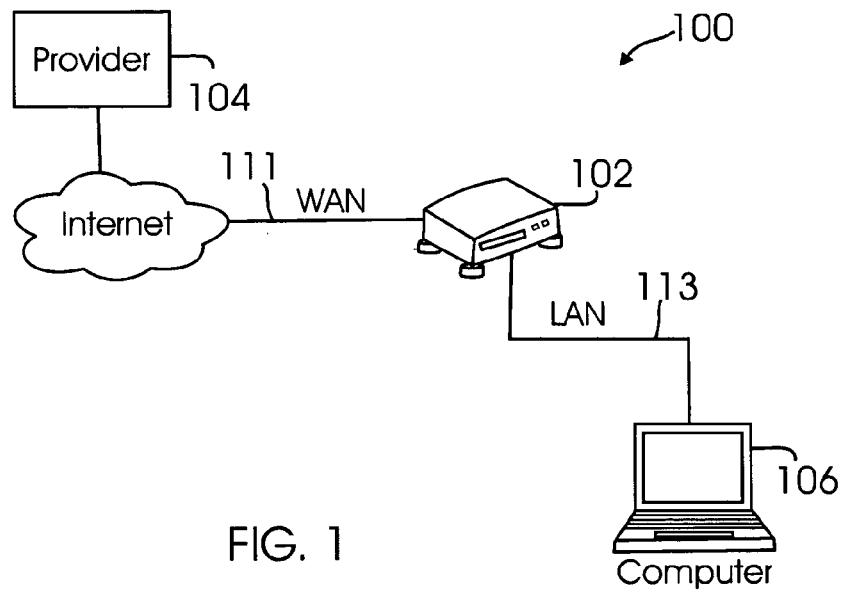
FIG. 1 shows a block diagram of a Gateway management system in accordance with an embodiment of the present invention.

Referring now to FIG. 1, a block diagram of a Gateway management system 100 is shown in accordance with an embodiment of the present invention. System 100 includes a Gateway 102 operably coupled to a wide area network (WAN) 111 and a local area network (LAN) 113. A computer 106 is optionally included in system 100 via LAN 113. Gateway 102 is operably coupled to the Internet via WAN 111. A service or equipment provider ("provider") 104, which may include a provider computer and/or a database, is shown connected to the Internet in one example.

Gateway 102 may be operably coupled to WAN 111 or LAN 113 via a wireless protocol or via a cable, and is described in more detail below. Gateway 102 may be any device that joins two networks together and serves as an entrance to a network. In one example, Gateway 102 may be implemented completely in software, completely in hardware, or as a combination of the two. In a further example, Gateway 102 is able to support wireless fidelity (WiFi) in general, and the IEEE 802.11 wireless networking standard in particular. Gateway 102 may also include a variety of typical routers, switches, and/or hubs, and in one example can support the 10/100/1000 Base-T standards, automatic negotiation, and automatic MDIX.

Computer 106 may include a variety of typical computers, and in one example is a typical personal computer including a general or special purpose processor, with network capabilities. In one example, computer 106 comprises a CPU, a memory, and a network adapter, which are interconnected by a bus. Other conventional means, such as a display, a keyboard, a printer, a bulk storage device, and a ROM, may also be connected to the bus. The memory stores network and telecommunications programs and an operating system (OS). The above-mentioned elements of computer 106 are well-known to the skilled person and commercially available.

Figure 2:
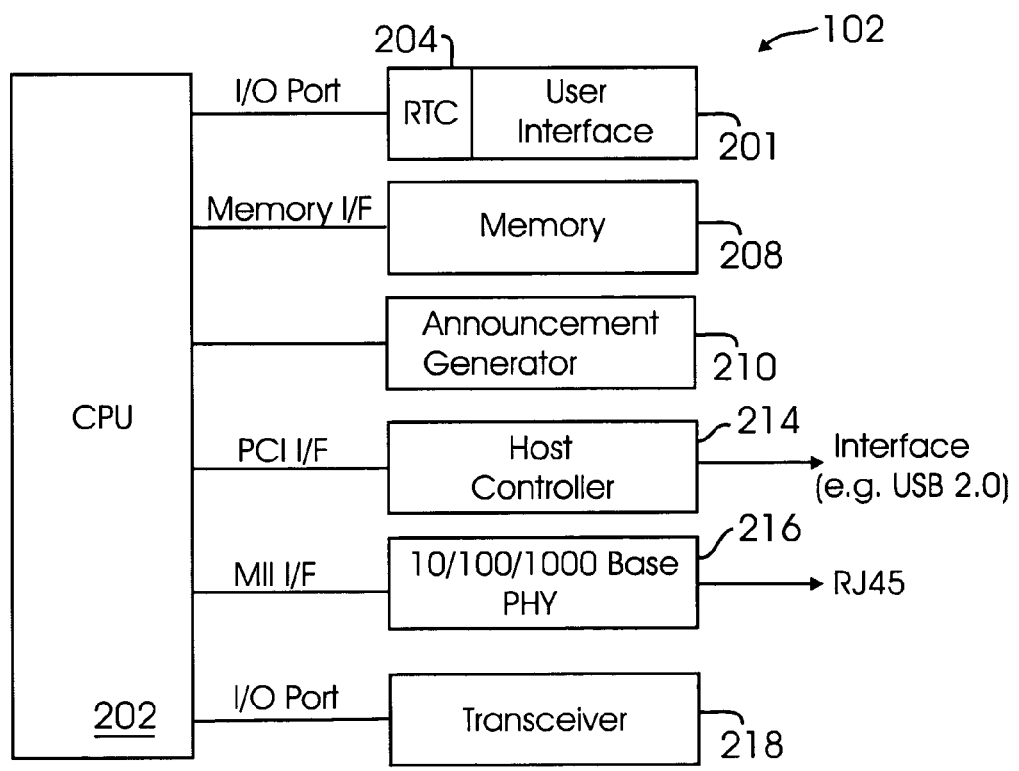
FIG. 2 shows a block diagram of a Gateway apparatus in accordance with an embodiment of the present invention.

Referring now to FIG. 2 in conjunction with FIG. 1, a block diagram of an example of Gateway 102 is shown in accordance with an embodiment of the present invention. Gateway 102 includes a central processing unit (CPU) 202 operably coupled to: a real-time clock (RTC) 204 and a user interface 201 via an input/output port; a memory 208 (e.g., SDRAM or flash memory) via a memory interface; an announcement generator 210; a host controller 214 (e.g., a Universal Serial Bus (USB) host controller) via a peripheral component interconnect (PCI) interface; a LAN connector 216 (e.g., a 10/100/1000 Base-T Ethernet port) via a MII interface; and a transmitter/receiver (transceiver) 218 via an input/output port.

CPU 202 is a high performance, highly integrated, and highly flexible system-on-chip (SOC) in one example. CPU 202 may include a variety of processors, and in one example is a IXP420 266 MHz processor available from Intel Corporation of Santa Clara, Calif. Conventional CPUs are applicable and may also be used.

RTC 204 may be utilized to provide announcement generation parameters based upon time (e.g., password expiration time and/or date, announcement generation and transmission interval). In accordance with another embodiment of the present invention, firmware in Gateway 102 is capable of sending announcements including password and IP address, to various providers following a schedule utilizing RTC 304.

User interface 201 is operably coupled to processor 202 for displaying Gateway functionality to the user, and in one example includes a light emitting diode (LED) system. In one example, LEDs may be used to indicate different functions or status of Gateway 102. For example, an LED may be on when the apparatus is powered on and ready for use or off when the device is powered off. An LED may blink when the device is booting up or shutting down or providing announcements or detecting an announcement trigger. An LED may also indicate connection to and/or operation with a LAN, a WAN, and/or a portable storage device such as a USB flash drive. In one embodiment, firmware and hardware may be used in conjunction with the LED(s) to indicate status of the Gateway, connection to and operation with the LAN, the WAN, and other functions of the Gateway. In another embodiment, Gateway 102 may include a buzzer to indicate system function information to the user. In one example, a buzzer may beep when the Gateway detects an announcement trigger or sends an announcement, or when an IP address is not retrieved from the DHCP server.

Memory 208 may include a variety of memories, and in one example includes SDRM and flash memory. As a further example, 32 MB of SDRAM by way of two 8 MB×16 SDR DRAM and 8 MB of flash memory by way of one 64 Mbits NOR type flash memory may be utilized. In one example, memory 208 may be used to store passwords and IP addresses.

Announcement generator 210 provides an announcement for transmission to a provider. The announcement includes at least a password for remotely accessing the Gateway and a current IP address (or resolvable name) of the Gateway retrieved from a server, for example a DHCP server. In one embodiment, the password is for remote access to the Gateway and different from a password used for local access to the Gateway. The password for the announcement should be unique to each Gateway and temporary in duration as static passwords are insecure due to their susceptibility to dictionary attack, exposure through employee turnover at the service provider/technical support facility, and other means. The IP address of the Gateway, a resolvable name (pre-assigned) of the Gateway, or both may be retrieved for packaging in the announcement.

Host controller 214 may include a storage device interface, which may be a USB 2.0 interface in one example. The storage device interface may be used to connect to memory cards and/or flash drives. In particular, a storage device interface may receive a storage device including a predetermined list of announcement triggers for downloading to memory 208. The predetermined list may be provided from various sources, including but not limited to client computer 106. It is noted that the predetermined list may be provided to Gateway 102 by other methods as well (e.g., wireless). Host controller 214 is not limited to a single storage device interface or the USB 2.0 interface and may include a greater number and/or different types of interfaces (e.g., PCMCIA).

LAN connector 216 provides for connection of Gateway 102 to a LAN, and in one example supports the 10/100/1000 Base-T standards, automatic negotiation, and automatic medium dependent interface crossover (MDIX). In a further example, LAN connector 216 includes a Ethernet RJ-45 port.

Transceiver 218 is a device that both transmits and receives/detects digital and/or analog signals, and in the context of the present invention is able to detect wireless signals from a wireless device requesting access to a network, and is further able to detect signals through a network wire and apply signals onto the network wire.

Figure 3A:
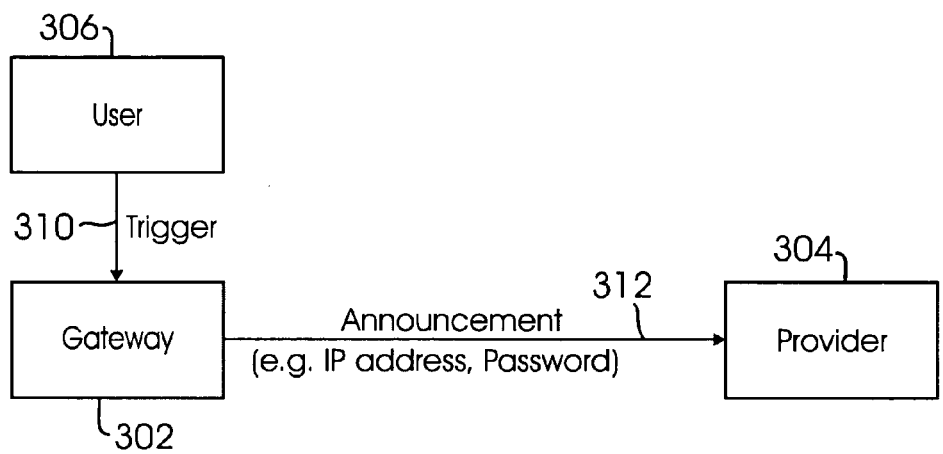
FIGS. 3A, 3B, and 3C show block diagrams of examples of Gateway triggering mechanisms in accordance with embodiments of the present invention.
Figure 3B:
Figure 3C:
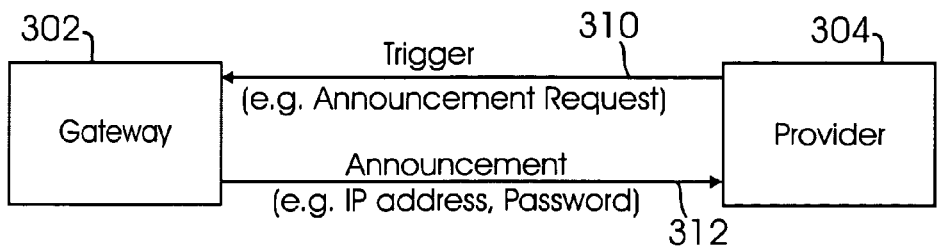

Referring now to FIGS. 3A, 3B, and 3C in conjunction with FIGS. 1 and 2, block diagrams of examples of Gateway triggering mechanisms are shown in accordance with embodiments of the present invention.

The triggering mechanism may originate from or be initiated by the user/subscriber in accordance with an embodiment of the present invention, as shown in FIG. 3A. A user computer 306 provides an announcement trigger 310 to a Gateway 302 along a LAN connection, which may be a wired and/or a wireless connection. Gateway 302 then generates an announcement 312 and sends the announcement to provider 304 along a WAN connection, which may be a wired and/or a wireless connection. Having the user/subscriber initiate the announcement trigger is beneficial for security reasons; i.e., network information is offered voluntarily with full knowledge and permission of the user/subscriber.

Initiation of an announcement trigger may be made by the user in various ways. For example, the user may: select a button on the Gateway's graphical user interface (GUI); select an option in a setup wizard, in one example, the setup wizard for the Gateway allowing the user to identify announcement triggers from a list of potential announcement triggers; and send a command via a non-PC device, such as via a wireless mobile device (e.g., PDAs, mobile phones).

An announcement trigger may also be internally provided or self-triggered by the Gateway, periodically or according to a schedule, in accordance with an embodiment of the present invention as shown in FIG. 3B. RTC 204 may prompt processor 202 as an announcement trigger such that Gateway 302 generates an announcement 312 which is then sent to provider 304 along a WAN connection, which may be a wired and/or a wireless connection.

In one example, with no intent to limit the invention thereby, the Gateway can be programmed to send an announcement: on power-up and the user can initiate the announcement trigger by power cycling the Gateway; on a SIP registration; on a DDNS registration; after termination of any remote access session (in effect generating a new password after the management session termination invalidates the previous password, i.e., one time use forces password expiration); after acquiring (or re-acquiring) an IP address; when a wireless device successfully joins/leaves the network; and after the existing password expires via timeout (time/date lapses).

The triggering mechanisms may also originate from or be initiated by the service/equipment provider in accordance with an embodiment of the present invention, as shown in FIG. 3C. A provider 304 provides an announcement trigger 310 to a Gateway 302 along a WAN connection, which may be a wired and/or a wireless connection. In one case, the provider will require the IP address of the Gateway prior to sending an announcement trigger. In another example, a global trigger via a polling or a discovery means may be used by the provider to trigger a Gateway or a plurality of Gateways without prior knowledge of the Gateway IP address. For example, when using the Session Initiation Protocol (SIP), a SUBSCRIBE from a server could be used to trigger a NOTIFY from the Gateway. The contents of the NOTIFY can include an IP address, a temporary randomly generated password, and other critical parameters. After being triggered, Gateway 302 generates an announcement 312 including a password for accessing Gateway 302 and an IP address (or resolvable name) of the Gateway. Gateway 302 then sends the announcement to provider 304 along a WAN connection, which may be a wired and/or a wireless connection. This mechanism is desirable so the Gateway may be actively managed and/or maintained remotely by the provider.

Thus, FIGS. 3A through 3C illustrate that an announcement may be generated on demand (triggered) by an announcement trigger initiated by the provider (FIG. 3A) or the user/subscriber (FIG. 3B) and/or self-triggered by the Gateway periodically based upon an interval of time or according to a schedule (FIG. 3C).

A given announcement trigger may be implemented by various means and methods. It is noted that in one embodiment of the present invention, a message/announcement is always generated when the Gateway receives/detects an announcement trigger, and that a temporary remote access password is always regenerated for each message. One method is to create a list of "known" (pre-established) announcement triggers/events and to selectively enable/disable each trigger. This method effectively provides a method by which some trigger events are optionally filtered so as to prevent announcement floods. For example, the Gateway can be programmed to send an announcement when triggered by SIP registration but to ignore IP address acquisition as a trigger. Furthermore, one or more different triggers may be "mixed and matched" to compile a customized/personalized list of announcement triggers. For example, a trigger may include when 1) a wireless device successfully joins/leaves the network and 2) a remote access session has not yet been initiated. This method will also further prevent triggering and sending a large number of announcements (from a potentially large number of devices) to a server within a specified timeframe.

Figure 4:
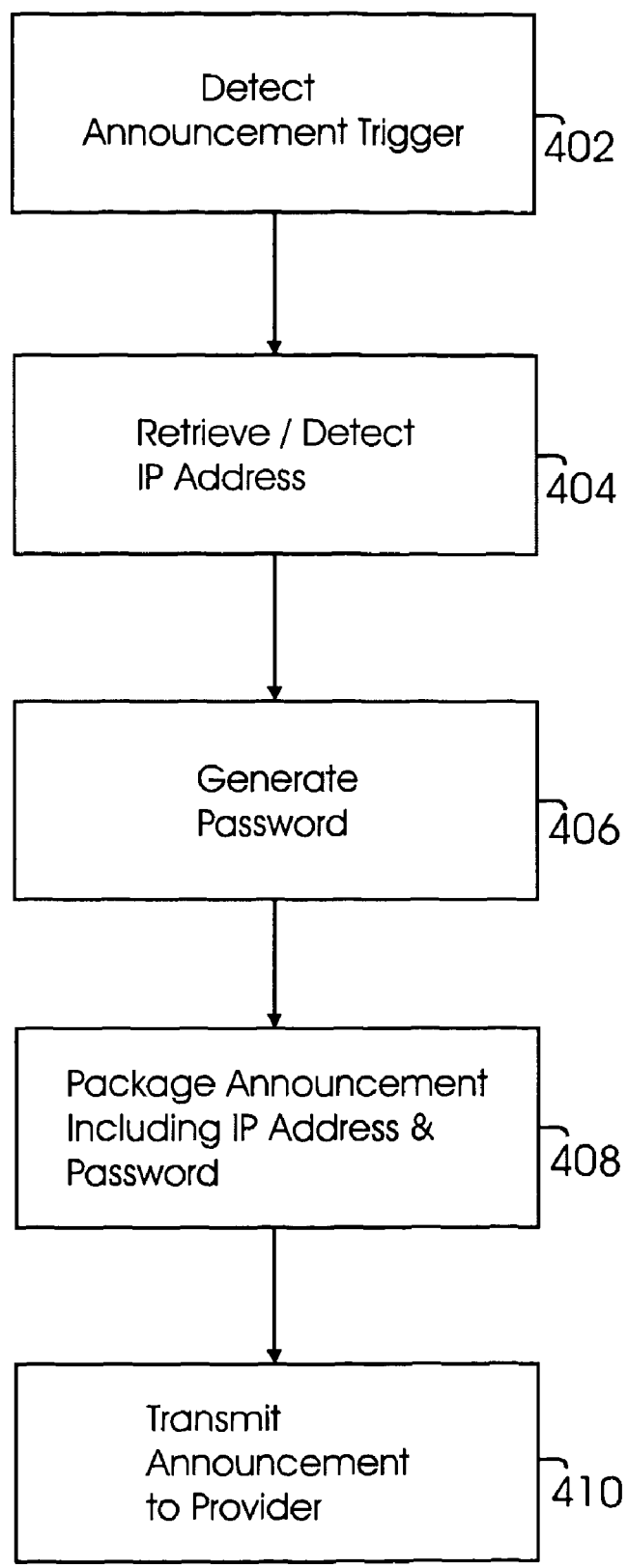
FIG. 4 shows a flowchart of a method for transmission of an announcement in accordance with an embodiment of the present invention.

Referring now to FIG. 4 in conjunction with FIGS. 1 through 3C, a flowchart of a method for transmitting an announcement from a Gateway is shown in accordance with an embodiment of the present invention. At step 402, an announcement trigger (e.g., trigger 310) is detected at a Gateway (e.g., Gateway 302). At step 404, the Gateway retrieves a current IP address of the Gateway, and at step 406, the Gateway generates a password which will usually be temporary. At step 408, the IP address and the password are packaged into an announcement (e.g., announcement 312), and at step 410, the announcement is transmitted to a provider's (e.g., provider 304) pre-identified server database (e.g., pre-identified as an IP address or URL).

Upon receipt or detection of an announcement trigger or request, the Gateway must generate an announcement, including but not limited to a temporary remote access password and a current WAN IP address. By temporary, it is meant that the password is not static or permanent but dynamic. The temporary password may be made dynamic through various methods, including but not limited to expiration based upon time or date or one time use (i.e., if the password is used it cannot be used again). It is noted that additional information may be included in the announcement, such as a remote access username (e.g., if different than the default username), and an access point media access control (MAC) address.

Examples of parameters for a temporary password may include an expiration time for the password (e.g., from hours or days), and an expiration date for the password. RTC 204 may be used for entering and enforcing time-based parameters.

Various protocols may be used to package and send an announcement, but preferably, the protocol should be independent of the trigger type or method (e.g., SIP registration, DDNS registration, or other inform methods; e.g., SNMP traps, syslog, and TR-069) for greater flexibility and usage. In one embodiment, the announcement may be encrypted by one or more various well known encryption methods.

Figure 5:
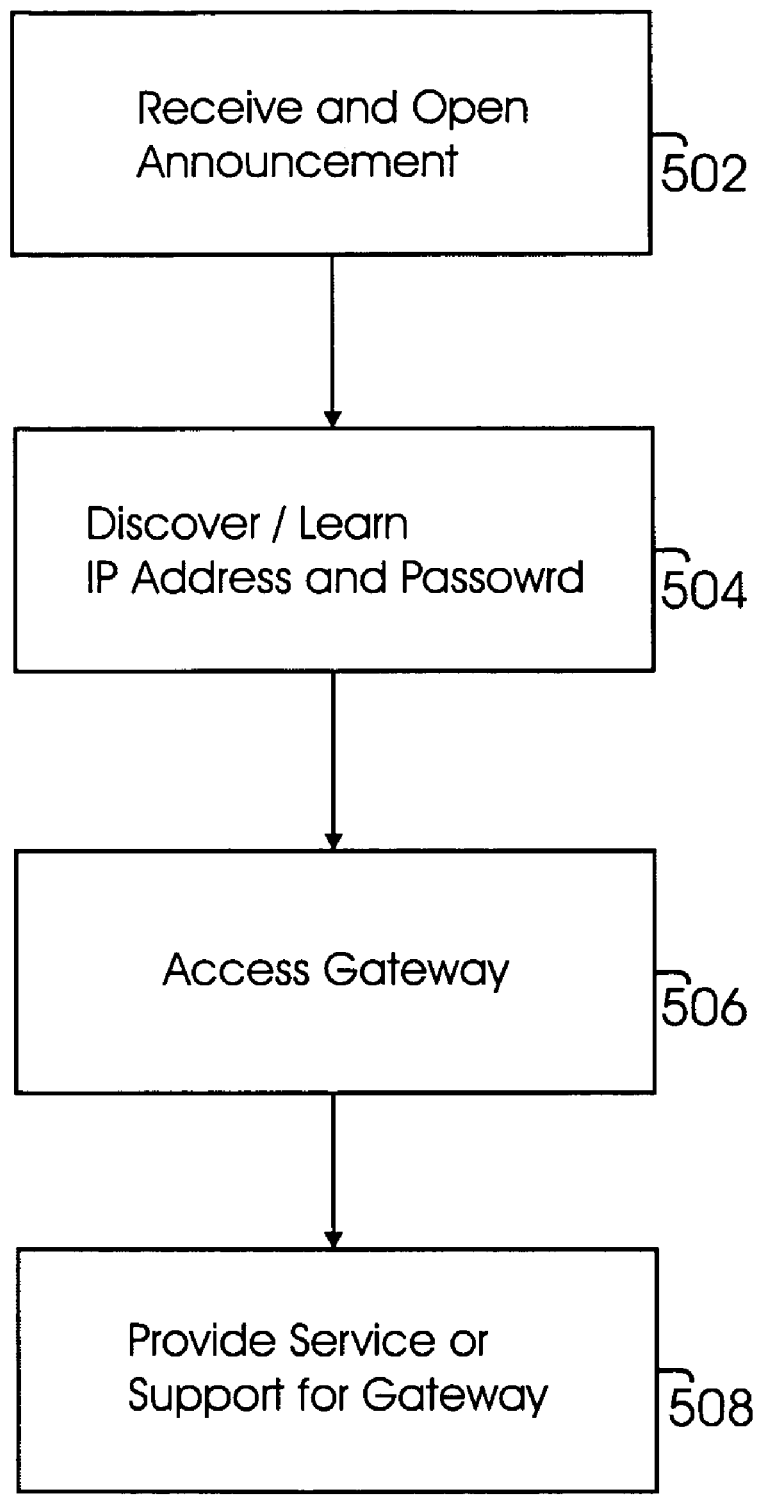
FIG. 5 shows a flowchart of a method for reception of an announcement in accordance with an embodiment of the present invention.

Referring now to FIG. 5 in conjunction with FIGS. 1 through 3C, a flowchart of a method for receiving an announcement from a Gateway is shown in accordance with an embodiment of the present invention. At step 502, an announcement (e.g., announcement 312) from a Gateway (e.g., Gateway 302) is received and opened by a provider (e.g., provider 304). At step 504, the announcement data, at least including the IP address (or resolvable name) of the Gateway and the password for Gateway access, is discovered. At step 506, the Gateway is accessed by the provider, and at step 508, the Gateway is managed or maintained remotely with services from the provider.

Provider 104 must institute an interactive database to collect the information sent by the Gateway. The database may be accessible to support representatives. In the case of IP registration via SIP, the collection point may be the SIP registration server. In the case of IP registration via dynamic DNS (DDNS), the collection point may be the DDNS registration server. IP address retrieval may occur via named resolution using ordinary access to DNS (i.e., the customer support personnel having access to a database of names (URLs) can type a name into a Web browser, which is subsequently resolved to an IP address by DNS). In other cases, for example when the IP address is directly transmitted by the Gateway, the collection point may vary per provider preference. The provider must at least provide a means by which passwords can be collected for each registered Gateway and stored securely. As noted above, the provider database can either passively collect information received from a Gateway, triggered by spontaneous user action or scheduling or the Gateway changing state, or actively collect information through polling or discovery triggering.

In accordance with another embodiment of the present invention, Gateway 102 may be managed or controlled by a provider via the Web. In one embodiment, data may be accessed and files shared via a Web browser. User name and password may be required before access is allowed. MAC addresses, lists, and apparatus or system settings may be added to or edited via the Web. Accordingly, the present invention advantageously provides for remote management and maintenance of a Gateway and potentially an associated network via the Internet.

In this embodiment, Gateway 102 may be accessed via a Web browser and a Web server. A Web home page may provide for data access and for receipt and use of the IP address and password, which may include a user name, to access the Gateway and potentially an associated network. Administrator rights may give access to LAN, system, user, and status settings and properties. Groups and shared folders may be added or existing properties edited via the Web. Reset to default and firmware upgrades may also be provided via the Web. Accordingly, the present invention advantageously provides for remote Gateway and possibly network management and maintenance via the Internet.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A gateway, comprising:
   a processor configured to provide an announcement when initiated by an announcement trigger from a customized list of announcement triggers selected and combined by a gateway user from a list of potential announcement triggers in a setup wizard,
   wherein the announcement trigger includes a combination of multiple triggers configured to function as a more complex trigger,
   wherein the announcement includes an IP address and a password, and
   wherein the list of potential announcement triggers includes a user-initiated announcement trigger, a gateway-initiated announcement trigger, and a provider-initiated announcement trigger; and a transmitter for transmitting the announcement directly to a provider which does not have prior knowledge of the IP address in the announcement.

2. The gateway of claim 1, wherein the announcement includes a dynamic IP address of the gateway and a temporary password for accessing the gateway.

3. The gateway of claim 1, wherein the announcement trigger is based on a time schedule.

4. The gateway of claim 1, wherein the announcement trigger is provided by selecting a button on a gateway graphical user interface, selecting an option in the setup wizard, or power cycling the gateway.

5. A gateway, comprising:

means for detecting an announcement trigger from a customized list of announcement triggers selected and combined by a gateway user from a list of potential announcement triggers in a setup wizard,
wherein the announcement trigger includes a combination of multiple triggers configured to function as a more complex trigger,
wherein the list of potential announcement triggers includes a user-initiated announcement trigger, a gateway-initiated announcement trigger, and a provider-initiated announcement trigger;

means for providing an announcement when triggered, the announcement including an IP address and a password; and means for transmitting the announcement directly to a provider which does not have prior knowledge of the IP address in the announcement.

6. A method for managing a gateway, the method comprising:

selecting and combining announcement triggers from a list of potential announcement triggers, in a setup wizard, to compile a customized list of announcement triggers, the list of potential announcement triggers including a user-initiated announcement trigger, a gateway-initiated announcement trigger, and a provider-initiated announcement trigger;

triggering the gateway by an announcement trigger from the customized list of announcement triggers, wherein the announcement trigger includes a combination of multiple triggers configured to function as a more complex trigger;

providing an announcement including an IP address and a password; and transmitting the announcement to a provider's processor which does not have prior knowledge of the IP address in the announcement.

7. The method of claim 6, wherein the announcement includes a dynamic IP address of the gateway and a temporary password for accessing the gateway.

8. The method of claim 6, further comprising triggering the gateway based on a time schedule.

9. A method for managing a gateway, the method comprising:

receiving an announcement including an IP address and a password at a provider's processor which does not have prior knowledge of the IP address in the announcement, the announcement triggered by an announcement trigger from a customized list of announcement triggers selected and combined by a gateway user from a list of potential announcement triggers in a setup wizard,
wherein the announcement trigger includes a combination of multiple triggers configured to function as a more complex trigger,
wherein the list of potential announcement triggers includes a user-initiated announcement trigger, a gateway-initiated announcement trigger, and a provider-initiated announcement trigger;

managing the announcement; and accessing the gateway with the IP address and the password.

10. The method of claim 9, wherein the announcement includes a dynamic IP address of the gateway and a temporary password for accessing the gateway.

11. The method of claim 9, further comprising providing an announcement trigger to the gateway.

12. The method of claim 11, wherein the announcement trigger is based on a time schedule.

* * * * *